United States Patent
Yokota

(10) Patent No.: US 6,244,618 B1
(45) Date of Patent: Jun. 12, 2001

(54) STEERING DEVICE

(75) Inventor: Keishi Yokota, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/285,716

(22) Filed: Apr. 5, 1999

(30) Foreign Application Priority Data

Apr. 7, 1998 (JP) .................................. 10-094654

(51) Int. Cl.⁷ .................................................. B60R 21/16
(52) U.S. Cl. .................................... 280/728.3; 280/728.2; 200/61.55
(58) Field of Search ............................. 280/728.2, 728.3, 280/731, 728.1; 200/61.54, 61.55, 61.57, 61.56

(56) References Cited

U.S. PATENT DOCUMENTS

| | | | |
|---|---|---|---|
| 4,808,776 | * 2/1989 | Niwa et al. | 200/61.55 |
| 5,228,362 | * 7/1993 | Chen et al. | 280/731 X |
| 5,615,907 | * 4/1997 | Stanger | 280/728.2 |
| 5,627,352 | * 5/1997 | Suzuki et al. | 200/61.54 |
| 5,762,361 | * 6/1998 | Hermann et al. | 280/728.2 |
| 5,971,429 | * 10/1999 | Bramberger et al. | 280/731 |

FOREIGN PATENT DOCUMENTS 6-53365    7/1994 (JP) .

* cited by examiner

Primary Examiner—J. J. Swann
Assistant Examiner—F. Zeender
(74) Attorney, Agent, or Firm—Kanesaka & Takeuchi

(57) ABSTRACT

In a steering device having a horn switch which is actuated by depressing a module cover only, the module cover is securely connected to a base. An airbag device 20 is mounted on an end of a shaft 10. The base 22 of the airbag device 20 has hooks 46 projecting laterally from the base. The module cover 28 has a leg portion 42 which has openings 44 formed therein, to which the hooks 46 are engaged. A flange 32 of an inflator 24 is lied on a main plate 36 of the base 22 such that the periphery of the opening of the airbag 26 is held therebetween. As the module cover 28 is depressed, only the module cover 28 moves backward so that the horn switch 54 is actuated by pushing action via a rod 66. When the inflator 24 is actuated, the module cover 28 is securely supported by the hooks 46.

8 Claims, 4 Drawing Sheets

STEERING DEVICE

BACKGROUND OF THE INVENTION AND RELATED ART STATEMENT

The present invention relates to a steering device for a vehicle such as an automobile, in which a driver 10 airbag device is accommodated and, more particularly, to a steering device further provided with a horn switch.

A steering device has been widely used, in which an airbag device is accommodated and a horn switch is also incorporated in such a manner that the horn switch is turned on to sound a horn by depressing a module cover of the airbag device.

In the steering device of this type, the horn switch is switched on by depressing the entire airbag device including an inflator and an airbag. The airbag device is arranged to be movable back and forth and is biased forward (in a direction toward an occupant) by a spring. The spring should apply biasing force on the airbag device so as to overcome inertia force caused by the total weight of the airbag device, whereby a driver is required to depress the airbag device strongly to sound the horn.

A steering device in which a horn switch is actuated by depressing only a module cover with a small force is disclosed in Japanese utility model publication 6-53365A. In the steering device of the publication, an airbag, an inflator, and a retainer are fixed to a boss of the steering wheel and the module cover is connected to and supported by the retainer via a plate spring therebetween.

When the module cover is depressed, only the module cover moves backward so as to switch on a horn switch. Since only the module cover moves as mentioned, the force required for turning on the horn switch in this case is smaller than that in case of depressing the entire airbag device.

In the steering device disclosed in the publication of 6-53365, the module cover is connected to the retainer by plate springs. Therefore, when the inflator is actuated to inflate the airbag so that large pressure is exerted on the module cover by the airbag, the spring may be deeply deformed so that there is a possibility that the module cover is thus significantly separated from the retainer.

OBJECT AND SUMMARY OF THE INVENTION

It is an object of the present invention to provide a steering device in which a horn switch is turned on by depressing a module cover, and which supports securely the module cover even when an inflator is actuated.

A steering wheel device of the present invention comprises a steering and an airbag device which is accommodated in a portion of the steering wheel confronting an occupant. The airbag device comprises an airbag, a module cover which is disposed on the occupant side about the airbag, a base which is disposed on the other side of the occupant side about the airbag and an inflator for generating gas for inflating the airbag. The module cover is movable in a backward direction apart from the occupant and is biased by an elastic member in a forward direction. The steering device further comprises a horn switch which is switched on by movement of the module cover in the backward direction. The module cover has a portion extending in the backward direction and is provided with openings formed in the portion. The base is provided with hooks engaged with the openings.

In the steering device of the present invention, since the openings of the module cover are engaged with the hooks of the base, the module cover is securely held to the base even when the inflator is actuated and the module cover is thus strongly pressed forward by the airbag.

A tip portion of each hook, which is positioned outside the corresponding opening when engaged, is preferably bent in the backward direction of the module cover. It is preferable that the base comprises a main plate, which confronts the occupant, and the hooks, which project from the outer periphery of the main plate, and that the hooks are disposed at predetermined intervals along the outer periphery. This configuration enables the module cover to be securely engaged with the base.

DETAILED DESCRIPTION OF PREFERRED EMBODIMENTS

Hereinafter, a first embodiment of the present invention will be described with reference to FIGS. 1 through 5.

Figure 1:
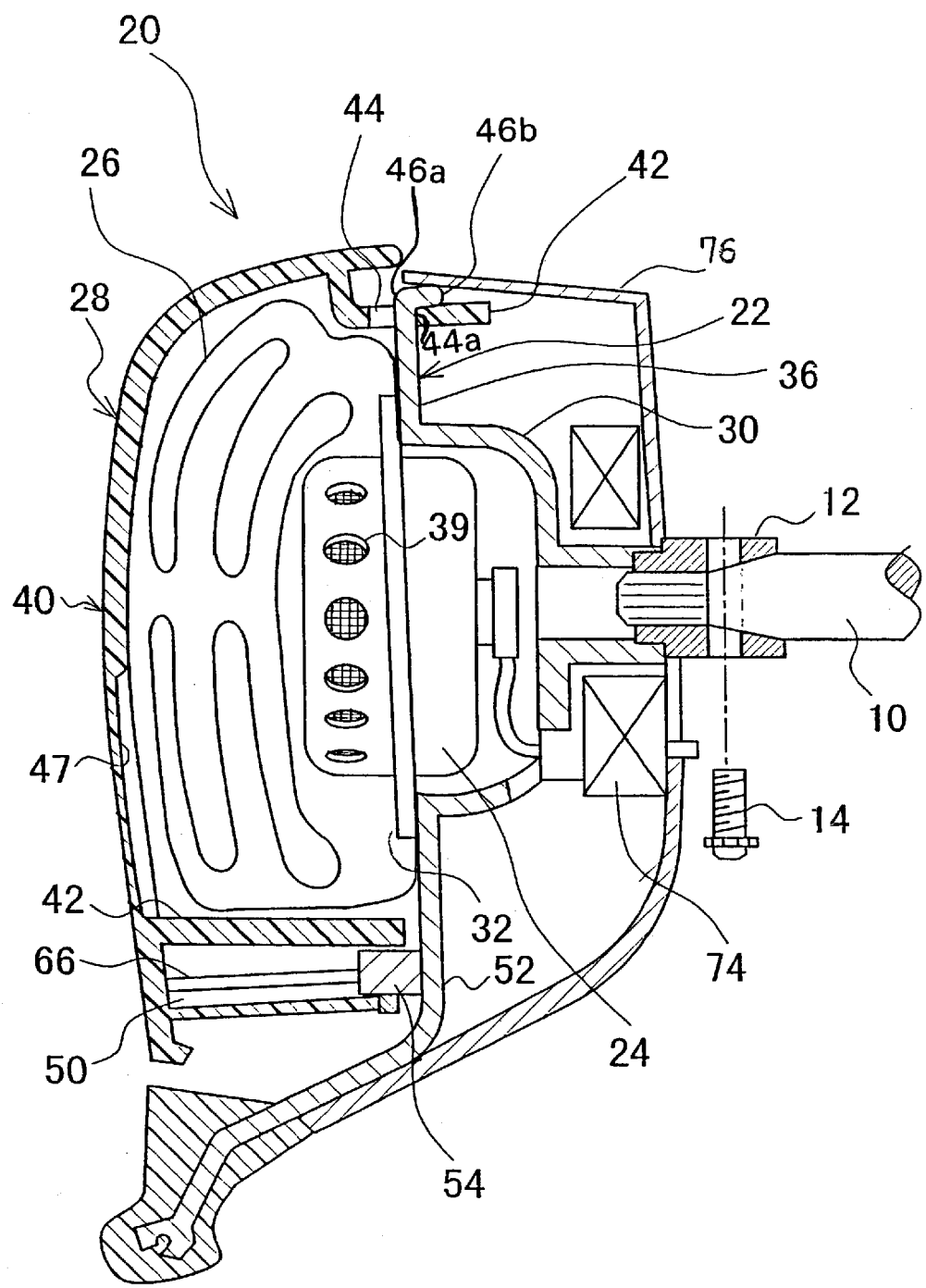
FIG. 1 is a vertical sectional view of a steering device according to an embodiment.

As shown in FIG. 1, an airbag device 20 is attached to an end of a steering shaft 10 via an attachment 12. Numeral 14 designates a bolt for fixing the attachment 12.

The airbag device 20 mainly comprises a base 22 connected to the attachment 12, an inflator 24 and an airbag 26 which are fixed to the base 22, and a module cover 28 covering the airbag 26.

The base 22 comprises a main plate 36 having a concavity 30 at the center thereof. The inflator 24 is disposed such that a lower end thereof enters into the concavity 30. The inflator 24 has a flange 32 radially projecting. The airbag 26 has an opening, a periphery of which is held between the flange 32 and the base 22.

Figure 2:
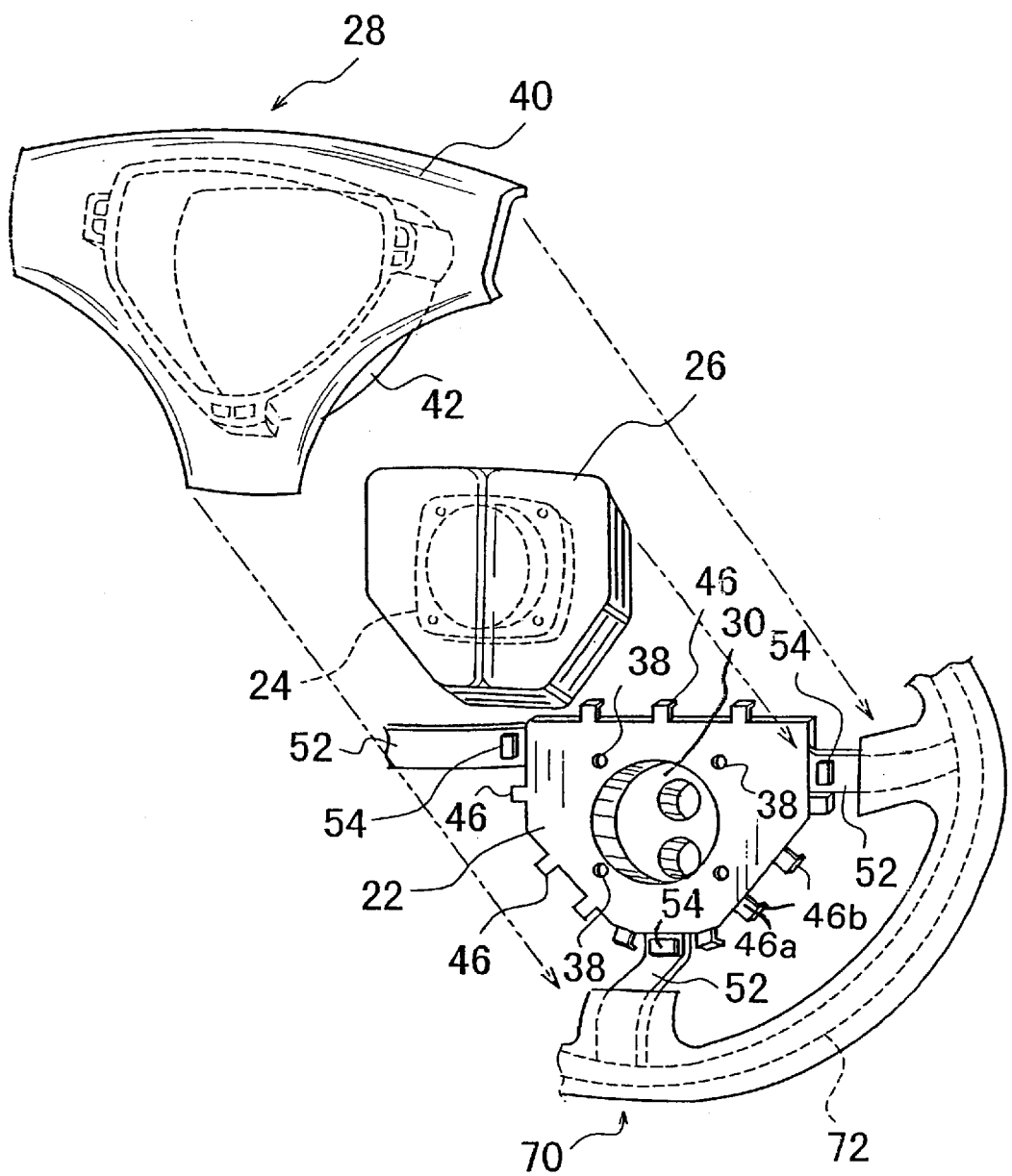
FIG. 2 is an exploded perspective view of the steering device according to the embodiment.

As shown in FIG. 2, a portion of the main plate 36 around the concavity 30 is provided with through holes 38 for bolts or rivets. The bolts or rivets are inserted into the through holes 38 through the respective through holes formed in the flange 32 of the inflator 24 and formed in the periphery of the opening of the airbag 26, whereby the airbag 26 and the inflator 24 are fixed to the base 22. Numeral 39 in FIG. 1 designates a gas outlet formed in the inflator 24.

After the periphery of the opening of the airbag 26 is held between the flange 32 and the base 22 to fix the airbag 26, the airbag 26 is folded in a predetermined configuration and is covered by the module cover 28.

The module cover 28 comprises a cover portion 40 and a leg portion 42 extending backward from the cover portion 40. The leg portion 42 is provided with a plurality of openings 44 into which hooks 46 projecting from the periphery of the base 22 are inserted. Each hook 46 is formed in a L-like shape with an elongated portion 46a and a tip 46b, as clearly shown in FIG. 2, so that its tip 46b, which is positioned outside the opening 44 when inserted, is bent backward along the leg portion 42. This configuration makes it extremely difficult that the hook 46 comes off the opening 44.

Figure 3:
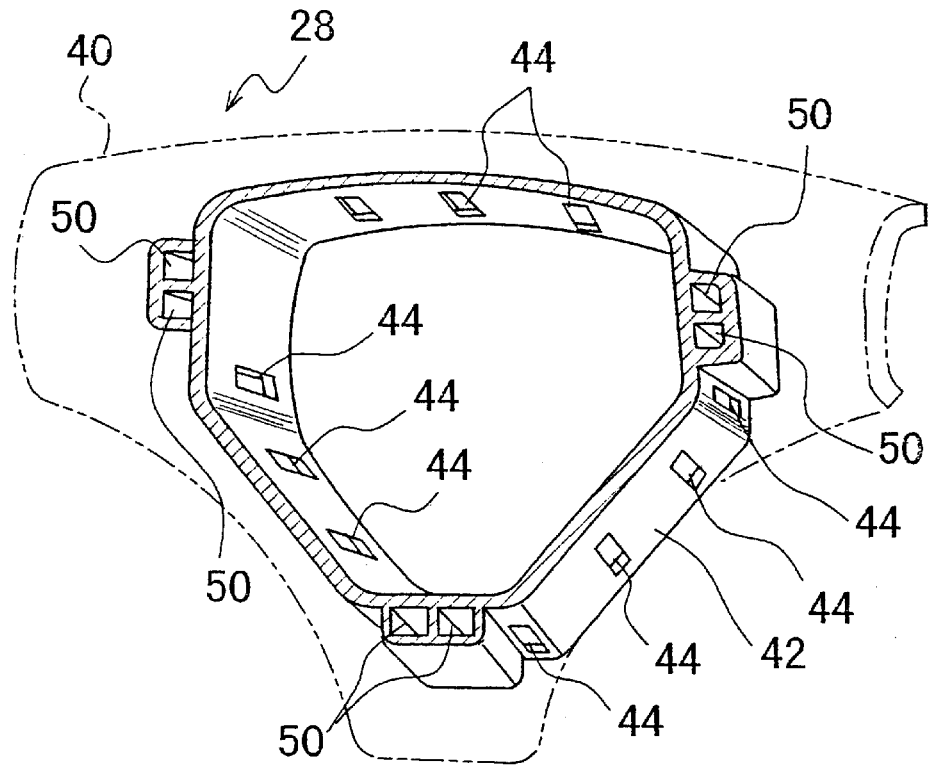
FIG. 3 is a sectional perspective view of a module cover.

As clearly shown in FIG. 3, the leg portion 42 is provided to surround the periphery of the base 22 and the openings 44 are formed at predetermined intervals in the circumferential direction. The number of the hooks 46 provided on the periphery of the base 22 is the same as the number of the openings 44. The leg portion 42 has cutouts, not shown, into which spokes 52 are fitted.

The module cover 28 has switch engagement holes 50 formed along the leg portion 42. The spokes 52 radially extend from the base 22 and are provided with horn switches 54, respectively.

Figure 4:
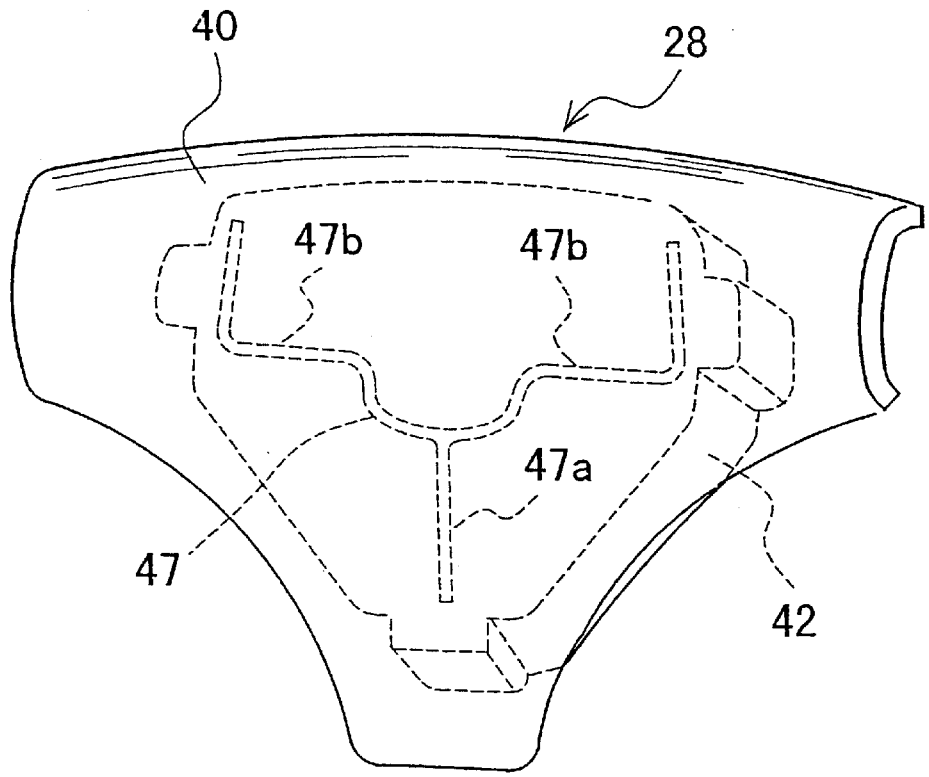
FIG. 4 is a perspective view of the module cover.

As shown in FIG. 4, the cover portion 40 has a tear line 47 formed in the back surface thereof. The tear line 47 is composed of shallow grooves. When the airbag 26 is inflated and the cover portion 40 is pressed forward by the inflated airbag 26, the cover portion 40 is torn along the tear line 47. The tear line 47 extends in three ways from a portion about the center of the cover portion 40. A tear line part 47a of the tear line 47 extends downward in FIG. 4 until reaching the leg portion 42. A tear line part 47b of the tear line 47 extends right and left and extends, on both sides, upwardly in FIG. 4 after reaching the leg portion 42.

Figure 5:
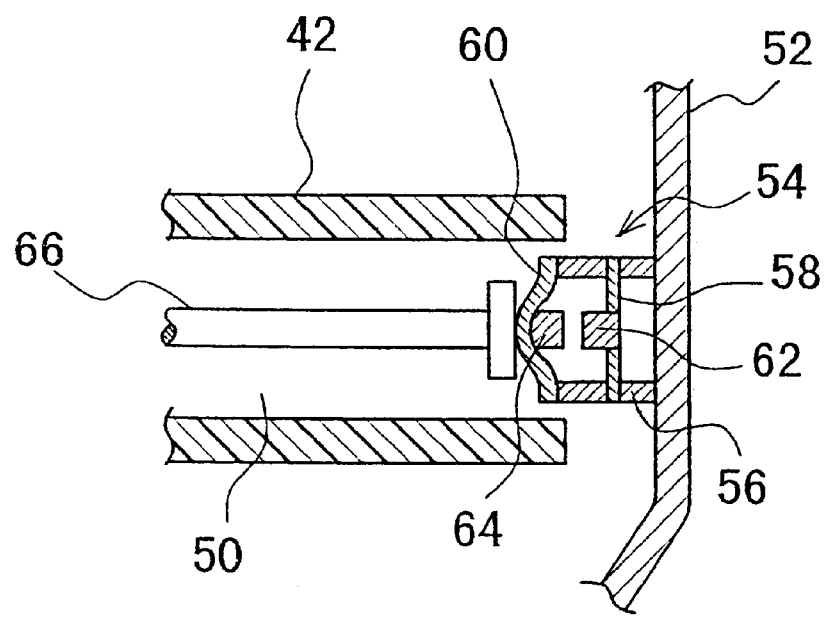
FIG. 5 is a sectional view showing the construction of a horn switch.

As shown in FIG. 5, each horn switch 54 comprises a housing 56, a first plate spring 58 disposed within the housing 56, a second plate spring 60 disposed on the end of the housing 56, and contacts 62, 64 disposed on the plate springs 58, 60, respectively. The cover portion 40 has rods 66 each extending toward the corresponding horn switch 54 in such a manner that the end of the rod 66 lightly touches the plate spring 60 of the corresponding horn switch 54.

As shown in FIG. 2, the respective ends of the spokes 52 are connected to a rim 72 of the steering wheel 70. Numeral 74 in FIG. 1 designates a clock spring and numeral 76 designates a lower cover.

In the steering device structured as described above, when the module cover 28 is not depressed, the module cover 28 is in the forward-most position where the rear ends 44a of the openings 44 are in contact with the hooks 46 because the module cover 28 is biased forward by the plate springs 60. As the module cover 28 is depressed, only the module cover 28 moves backward to press at least one of the plate springs 60 by the rod 66 so that the contact 64 touches the contact 62 so as to switch on the horn switch 54, thereby sounding the horn. As the module cover 28 is released from being depressed, the module cover 28 moves forward by the reaction force of the plate spring 60.

When the vehicle comes into collision and the inflator 24 is actuated, the airbag 26 is inflated by gas generated by the inflator 24 and the module cover 28 is opened along the tear line 47. At this point, the module cover 28 is entirely pressed strongly in the forward direction (the leftward direction in FIG. 1). Since the hooks 46 are engaged with the openings 44, the leg portion 42 of the module cover 28 is securely supported by the base 22, so only the cover portion 40 is opened along the tear line 47.

In the embodiment as mentioned above, only the module cover 28 is depressed to sound the horn so that small force is enough to switch on the horn switch. When the inflator 24 of the airbag device 20 is actuated, the module cover 28 is kept in the state where it is securely connected to the base 22.

Figure 6:
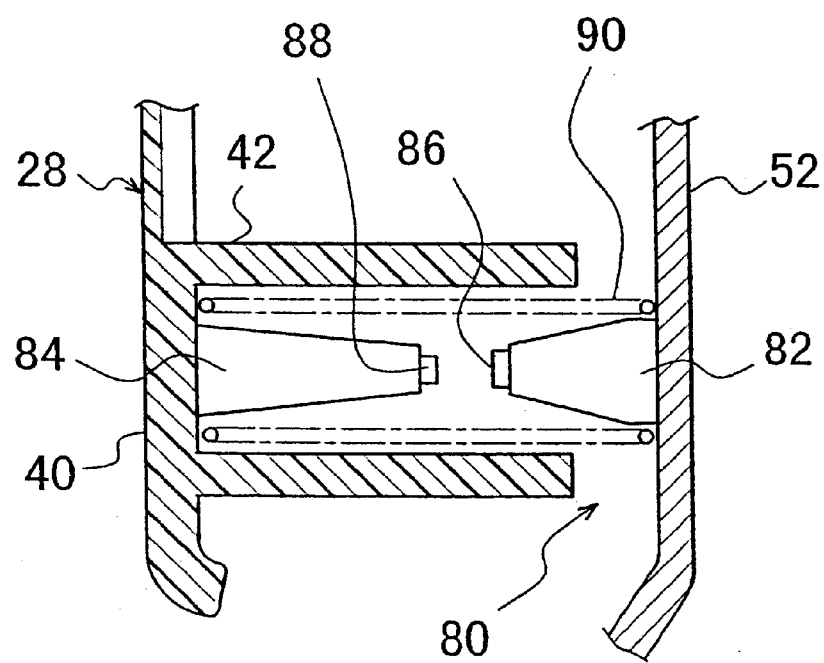
FIG. 6 is a sectional view showing the construction of another horn switch.

FIG. 6 is a sectional view showing the configuration of a horn switch according to a second embodiment. Each horn switch 80 according to this embodiment comprises a convexity 82 projecting from a spoke 52, a convexity 84 projecting from the cover portion 40 of the module cover 28, contacts 86, 88 disposed on the respective ends of the convexities 82, 84, and coil springs 90 disposed and compressed between the module cover 28 and the spoke 52 in its stressed state. The module cover 28 is in the forward-most position, by the force of the springs 90, where the rear ends of the openings 44 are in contact with the hooks 46. As the module cover 28 is depressed, the module cover 28 moves against the biasing force of the springs 90 in the rightward direction of FIG. 6 so that at least one of the contacts 86 touches the corresponding contact 88, thereby actuating the horn switch to sound horn. As the module cover 28 is released from being depressed, the contacts 86, 88 are separated so that the horn switch 80 becomes off.

In the present invention, the horn switch may be provided between the module cover and the steering, whereby the horn switch is turned on when the module cover moves backward and the switch is pressed by the cover and the steering.

The base may be formed integrally with the steering wheel.

As described above, in the steering device of the present invention, the module cover is securely held to the base. Just small force is required to depress the module cover to actuate the horn switch, thereby improving the operability of the horn switch.

What is claimed is:

1. A steering device comprising:

a steering wheel having at least one horn switch, and an airbag device attached to the steering wheel in front of an occupant, said airbag device including:

a base attached to the steering wheel and having a plurality of hooks extending laterally outwardly from the base, each hook having an elongated portion and a tip bent from the elongated portion to extend in a backward direction away from the occupant, an airbag attached to and disposed on the base, an inflator attached to the base for generating gas to inflate the airbag, a module cover for covering the airbag having a leg portion extending in the backward direction, and a plurality of openings formed in the leg portion for receiving the hooks therein, each opening having a rear end in the backward direction and a size greater than that of the elongated portion of the hook so that when the elongated portions are located in the openings, the module cover can move relative to the base, and an elastic member attached to the module cover to urge the module cover in a forward direction toward the occupant to allow each elongated portion of the hook to contact the rear end of the opening so that when the module cover is pushed toward the backward direction against a force of the elastic member, the rear end of the opening moves away from the hook and the horn switch is switched on.

2. The steering device as claimed in claim 1, wherein said module cover further includes switch engagement holes along the leg portion, and rods located in the respective switch engagement holes, one horn switch being disposed near one of the switch engagement hole to be operated by the respective rod.

3. The steering device as claimed in claim 2, wherein said elastic member is a plate spring, and said horn switch includes a housing and first and second contacts located in the housing, said plate spring being disposed on the housing and contacting one of the rods, and said second contact being fixed to the plate spring to face the first contact so that when the module cover is pushed, the plate spring is deformed to touch the second contact with the first contact to switch on the horn switch.

4. The steering device as claimed in claim 1, wherein the tip portion of each hook is positioned outside the corresponding opening when engaged.

5. The steering device as claimed in claim 1, wherein the base comprises a main plate, which confronts the occupant, and the hooks project from an outer periphery of the main plate, and wherein the hooks are disposed at predetermined intervals along the outer periphery.

6. The steering device as claimed in claim 1, further comprising at least one spoke extending from the base, and wherein the horn switch is mounted on the spoke.

7. The steering device as claimed in claim 6, wherein the module cover has at least one rod which presses the horn switch to switch on the horn switch when the module cover moves backward.

8. The steering device as claimed in claim 6, wherein the spoke has a first convexity, the module cover has a second convexity corresponding to the first convexity, the first convexity is provided with a first contact, and the second convexity has a second contact so that the first and second contacts come in contact to switch on the horn switch when the module cover moves backward.

* * * * *